July 2, 1940.   A. C. DUCATI   2,206,720
ELECTRICAL CONDENSER
Filed May 26, 1938

INVENTOR.
Adriano Cavalieri Ducati
BY
ATTORNEY.

Patented July 2, 1940

2,206,720

UNITED STATES PATENT OFFICE 2,206,720

ELECTRICAL CONDENSER

Adriano Cavalieri Ducati, Bologna, Italy, assignor to Radio Patents Corporation, New York, N. Y., a corporation of New York Application May 26, 1938, Serial No. 210,117
In Italy May 29, 1937

7 Claims. (Cl. 175—41)

My invention relates to electrical condensers and has for its object the provision of a condenser structure and method of making the same whereby moisture and other objectionable agents are prevented from being included in the condenser during its manufacture and the condenser is completely sealed from the outside to prevent penetration of such agents into the interior of the condenser body after its completion.

Another object is to provide a condenser of solid and compact construction.

In electrical condensers constructed by interleaving dielectric elements with conducting elements, it is customary to impregnate the assembled condenser unit with oil, wax, varnish or similar impregnating material in order to exclude the air and moisture which might otherwise find their way between the conductors and the dielectric and cause current leakage or discharges which ultimately may lead to breakdown of the dielectric. Impregnating materials such as mentioned above and known in the art must be highly liquid during the impregnating process to facilitate their introduction into the minute spaces between the electrodes and the solid dielectric. In order to obtain this high fluidity, elevated temperatures are required in most cases which may deleteriously affect the wax or oil in causing a partial separation into its constituent parts and resulting in a second dielectric having microscopic areas of different electrical characteristics.

In case of a varnish like impregnating or second dielectric the requisite high fluidity is obtained by the addition of a solvent which must be evaporated from the spaces between the electrodes and the primary dielectric thereby leaving voids and pores which are undesirable in the finished condenser unit.

Accordingly, another object of the invention is to provide a novel condenser structure and method of making the same comprising a substantially solid first dielectric between adjacent electrodes of the condenser and layers of a second plastic or fusible dielectric intermediate said first dielectric and adjacent electrodes wherein said second dielectric is of a highly homogeneous character and is substantially free from voids and pores thereby to render the condenser impervious to air, moisture and other objectionable agents.

Figure 1:
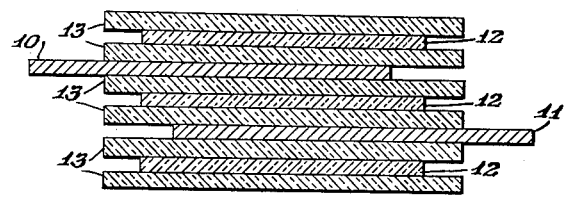
Figure 2:
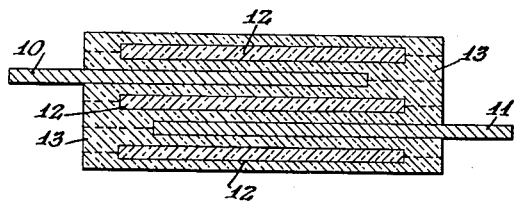

The above and further objects and advantages of the invention will become more apparent from the following detailed description taken with reference to the accompanying drawing forming part of this specification and wherein Figure 1 shows a condenser stack in a preliminary step of manufacture according to the invention, and Figure 2 shows the stack after completion of the manufacturing process.

Referring more particularly to Figure 1, there are shown a pair of electrodes 10 and 11 consisting of metallic plates or foil interleaved with sheets 12 of a first substantially solid dielectric material such as plates of mica or an equivalent material which remains substantially solid when subjected to heat and pressure to form a stack with the electrodes 10 and 11 projecting at opposite sides of the stack in a manner well known in the manufacture of electrical condensers to provide a means for securing metallic terminals to the electrodes for connecting the condenser in an electrical circuit. In the drawing only two electrodes have been shown, but it is understood that a plurality of electrodes may be stacked and separated by dielectrics in the manner shown with alternate electrodes of like electrical polarity projecting at opposite sides of the stack and having their projecting portions suitably connected such as by soldering, welding or clamping to form the terminals or electrodes for the condenser in a manner well understood by those skilled in the art.

According to the present invention there are provided additional dielectric sheets 13 placed between the electrodes and the sheets 12 and consisting of a fusible material adapted to become sufficiently plastic and to cold flow when subjected to heat and/or pressure such as materials of the type known as thermoplastic resins. The additional dielectric sheets 13 are of a larger size than the dielectric sheets 12 so as to project beyond the latter. A thermoplastic material obtainable in sheets and giving satisfactory results was found to be the polymerized resin of the styrolene (phenyl-ethylene) known as polystyrol ($C_8H_8$) and having a dielectric constant of about 2.7 in connection with mica as primary dielectric in a condenser structure of the type according to the invention. Other fusible or thermoplastic or resinous compounds suited for use with the present invention are ethyl cellulose, urea or casein plastics, chlorinated rubber and other products having the requisite physical and electrical characteristics such as the property to fuse or cold flow but not to become liquid or otherwise substantially change its physical or chemical characteristics when subjected to heat and pressure, and having a high dielectric constant.

As will be seen the second dielectric is a definite chemical compound, that is it is not a mixture or solution as previously used, and as such is not susceptible of physical or chemical separation of its constituents with the attendant disadvantages as previously described.

The stack made up in the above described manner is then subjected to heat and pressure thereby causing the dielectric sheets 13 to become plastic and to cold flow sufficiently in such a manner as to completely fill in the pores and interstices within the condenser body. In addition, the projecting portions of the sheets 13 will become fused togethed thereby forming a casing around the condenser stack and completely and hermetically sealing the same from the outside so as to prevent foreign matter from being included in and from subsequently penetrating into the interior of the condenser body. The thus obtained final condenser is shown in Figure 2 wherein the broken lines indicate the boundaries of the sheets 13 fused together during the heating and compressing operation.

The thickness of the additional dielectric 13 is preferably chosen in such a manner relative to the thickness of the primary dielectric sheets 12 that the stress exerted thereon and on the mica sheets 12 by the electrical field between the electrodes is maintained within permissible limits to insure the desired safety during operation and to prevent deterioration and breakdown of the dielectric by excess potential.

According to a preferred method of manufacturing a condenser of the type according to the invention, the stack as shown in Figure 1 is compressed and maintained in the compressed condition by a clamp of suitable construction (not shown), placed in a vacuum tank and exhausted to expel all air and moisture from within the condenser body. Thereupon, the condenser is heated by means of a suitable heating system thereby causing the sheets 13 to soften sufficiently and fuse together and unite the stack into a hermetically sealed unit or block due to the mechanical pressure exerted by the clamp surrounding the condenser. The condenser is then removed from the vacuum tank and may be additionally heated and compressed to assume its final form as shown in Figure 2.

It will be evident from the above that the invention is not limited to the specific constructions, materials and steps disclosed and described herein for illustration, but that the novel underlying idea is susceptible of various embodiments and modifications coming within the broader scope of the invention as defined in the appended claims. The specification and drawing are accordingly intended to be considered in an illustrative rather than a limiting sense.

I claim:

1. An electrical condenser comprising a stack of conducting sheets interleaved with sheets of a first substantially solid dielectric material, and further separate sheets of a thermoplastic dielectric interposed between each conducting sheet and the adjacent first dielectric sheets, said further dielectric sheets projecting at all sides beyond said first dielectric sheets and being in intimate contact therewith and the adjacent conducting sheets, the projecting portions of said further dielectric sheets being fused together to form a hermetic seal surrounding the condenser stack.

2. An electrical condenser comprising metallic sheets interleaved with dielectric elements to form a stack with the metallic sheets of like polarity projecting at different sides of said stack, each of said dielectric elements comprising a sheet of a first solid dielectric material having both sides covered by separate sheets of a thermoplastic dielectric projecting at all sides beyond said first sheets and being in intimate contact with the adjacent solid dielectric and metallic sheets, the projecting portions of said thermoplastic dielectric sheets being fused together to form a hermetic seal surrounding the condenser stack.

3. An electrical condenser comprising metallic sheets interleaved with dielectric elements to form a stack with the metallic sheets of like polarity projecting at different sides of said stack, each of said dielectric elements comprising a mica sheet having both sides covered by separate sheets of polystyrol projecting at all sides beyond said mica sheets and being in intimate contact therewith and the adjacent metallic sheets, the projecting portions of said polystyrol sheets being fused together to form a hermetic seal surrounding the condenser stack.

4. A method of making electrical condensers which comprises the steps of interleaving metallic sheets with dielectric elements, said dielectric elements consisting of sheets of a substantially solid dielectric and having both sides covered by separate sheets of a thermoplastic dielectric projecting at all sides beyond said solid dielectric sheets to form a stack, and heating and compressing said stack to press said thermoplastic sheets into intimate contact with the adjacent conducting and dielectric sheets and to fuse the projecting portions of said thermoplastic sheets to form a hermetic seal surrounding the condenser stack.

5. A method of making electrical condensers which consists in interleaving metallic sheets with mica sheets having both sides covered by separate sheets of polystyrol projecting at all sides beyond the mica sheets to form a stack, heating and compressing said stack to press said polystyrol sheets into intimate contact with the adjacent metallic and mica sheets and to fuse the projecting portions of said polystyrol sheets to form a hermetic seal surrounding the condenser stack.

6. An electrical condenser comprising conducting sheets interleaved with sheets of a first substantially solid dielectric material, and further separate sheets of thermoplastic dielectric material interposed between each conducting sheet and the adjacent first dielectric sheets, said further dielectric sheets projecting beyond the first dielectric sheets and being in intimate contact therewith and the adjacent conducting sheets, the projecting portions of said further dielectric sheets being fused together to form a hermetic seal enveloping the condenser body.

7. A method of making electrical condensers which comprises the steps of assembling metallic sheets and dielectric elements in interleaved relation, said dielectric elements consisting of sheets of a first substantially solid dielectric having both sides covered by separate sheets of a second thermoplastic dielectric and projecting beyond the first dielectric sheets to form a condenser body, and heating and compressing the condenser body for effecting intimate contact between the thermoplastic sheets and the adjacent conducting and first dielectric sheets and to fuse the projecting portions of the thermoplastic sheets to form a hermetic seal enveloping the condenser body.

ADRIANO CAVALIERI DUCATI.